United States Patent [19]

Gardiner et al.

[11] 3,830,106
[45] Aug. 20, 1974

[54] SAMPLING DEVICE

[75] Inventors: William Gardiner, Ulverston; Kenneth Briggs, Stainton, both of England

[73] Assignee: Glaxo Laboratories Limited, Middlesex, England

[22] Filed: Feb. 26, 1973

[21] Appl. No.: 335,937

[52] U.S. Cl. ............................................. 73/421 B
[51] Int. Cl. ....................... G01n 1/10, B01d 13/00
[58] Field of Search ........ 210/321; 73/421 B, 422 R

[56] References Cited
UNITED STATES PATENTS
3,483,990  12/1969  Litle ................................. 210/321
3,494,470  2/1970  Banfield ............................ 210/321

*Primary Examiner*—S. Clement Swisher
*Attorney, Agent, or Firm*—Bacon & Thomas

[57] ABSTRACT

A sampling device is described for removing dialysable fluids from a liquid for analysis. The device comprises a tubular dialysis membrane fixed on an elongated support, a helical passage being provided between the membrane and the support. In use, a carrier fluid is passed through the helical passage to remove for analysis fluids which pass through the membrane from a liquid in which the device is placed. The device is useful for monitoring chemical reactions, particularly fermentations.

10 Claims, 1 Drawing Figure

PATENTED AUG 20 1974 3,830,106
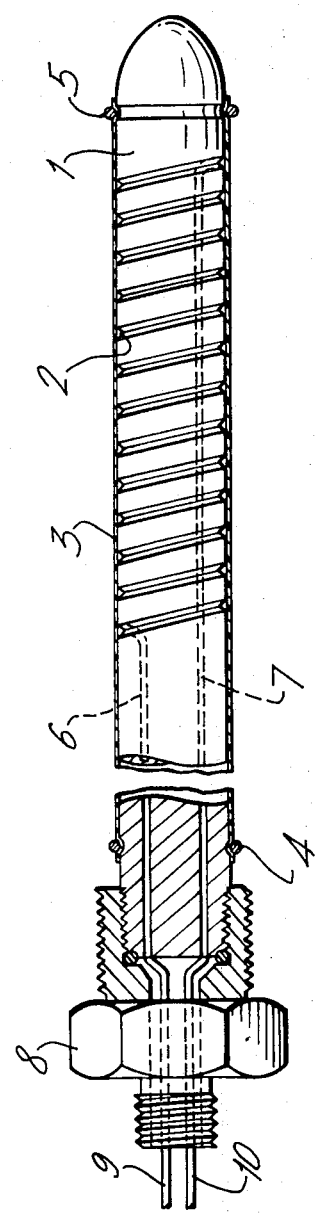

SAMPLING DEVICE

This invention relates to devices for use in the abstraction of samples of liquid or gaseous materials by dialysis from liquids containing such materials.

In some industrial processes such as chemical syntheses and particularly in fermentations, it is sometimes useful to be able to measure the amounts of the various components present in the media in order, for example, to assess the course of the reaction. Where a continuous process is concerned and essentially steady state conditions are desired, the process can usefully be controlled by varying the concentrations of components in the liquid in order to maintain an essentially steady state. Likewise, with batch processes which are carried out over a substantial period of time, changes in the concentrations of materials in the liquid can sometimes be used to follow the course of the process and to assist in its control.

The measurement of materials in a working liquid of an industrial process is generally carried out by removing a sample of the liquid and analysing it by conventional means. The disadvantage of this method is that a substantial period of time can elapse between the withdrawal of the sample and the completion of the analysis. Thus, when rapid changes occur in the concentrations of the materials being monitored the method is unsatisfactory. Fermentation broths, used in the production of antibiotics such as penicillins, are examples of working liquids in which the concentrations of certain of the components, e.g. glucose and ammonium ions, may change rapidly. If a process is to be monitored and controlled using the analysis results it is thus desirable to minimise the time taken for sampling and analysis.

In one aspect this invention provides a sampling device for removing dialysable materials from a liquid for analysis, said device comprising a member having a rounded cross-section with a helical groove or ridge formed in its exterior surface, means for fixing a tubular dialysis membrane over the said member whereby in use the groove or ridge and the membrane together form a helical passage for a carrier fluid, and an inlet and outlet through which in use a carrier fluid can be introduced to and withdrawn from the said helical passage.

The invention also provides a method of removing dialysable materials from a liquid for analysis, comprising passing a carrier fluid for said materials through the helical passage of a sampling device in accordance with the invention, the device being placed in the liquid and having a tubular dialysis membrane fixed in position on the member.

The device is conveniently provided with means for attachment to the inside of a tank, bath or other container for the working liquid of an industrial process. In use the inlet and outlet for the carrier fluid are preferably linked to a peristaltic pump which determines the rate of flow of the carrier fluid through the helical passage.

The member having a rounded cross-section is conveniently provided by a cylindrical member. The member is advantageously made of a material which is a relatively poor conductor of heat, particularly where the device is to be heat sterilised before use with a fermentation broth. The helical groove is conveniently cut into the exterior surface of the member, and for this purpose the material used must be machinable. It has been found that synthetic plastic rods such as for example polyamide (e.g. "Nylon" — registered Trade Mark) and polytetrafluoroethylene (e.g. "Teflon" — registered Trade Mark) rods can conveniently be used as the member. The diameter of the member can be varied as desired, diameters in the range of from 0.5 to 1.5 inches, for example about 0.75 inches, being conveniently used.

The cross-section and length of the groove or ridge formed in the member can be varied within wide limits as desired. In general, however, a groove having a V-shaped cross-section is to be preferred as providing the maximum surface area to the dialysis membrane. A shallow groove is advantageously used again to provide the maximum surface area of dialysis membrane per unit volume of the helical passage. The longer the length of the groove or ridge (and thus the length of the helical passage), the higher will be the concentration of ingredients in the sample withdrawn from the device for a given rate of flow of carrier fluid. On the other hand, a lengthening of the helical passage will provide a less discriminating sample in the sense that the length of time of the carrier fluid in the helical passage will be increased and the sample abstracted will contain concentrations of ingredients which are "averaged out" over the residence time of the carrier fluid in the helical passage. Thus the helical passage should preferably not be unnecessarily long although the residence time of the carrier fluid in the helical passage must be at least sufficient to provide a sample having the minimum concentration of ingredient to be analysed for which the analytical techniques to be used are sensitive.

The inlet and outlet for the carrier fluid are conveniently provided by passages which extend through the cylindrical member from one end thereof to the ends of the helical passage.

The dialysis membrane fits over the member and is conveniently in the form of a continuous tube of appropriate diameter fitting closely over the member. Seals, e.g. ring seals, can be located at either end of the groove or ridge to fix the membrane to the member and to seal the helical passage. The member provides a support for the membrane, and consequently it is possible to use membranes having a thickness which is substantially less than is necessary when a self-supporting tube is used. In general, the use of thin dialysis membranes is advantageous in that more rapid dialysis takes place. The membrane must however be of sufficient thickness to provide adequate strength. If desired, the device can be protected in use by a metal gauze which shields the membrane and prevents it coming into contact with solid particles in the working liquid which might tend to cause rupture.

The membrane used for dialysis will be a hydrophilic membrane with the appropriate semi-permeable characteristics. Cellulosic dialysis membranes are conveniently used, Visking cellulose dialysis tubing being one appropriate material.

If desired, the device according to the invention can also be used for the measurement or estimation of dissolved gases such as oxygen or carbon dioxide in a working solution. For this purpose, a hydrophobic gas-permeable membrane can be used. One material for such a membrane is polytetrafluoroethylene, for example the material known as "Teflon".

The invention will now be further described with reference to the accompanying drawing which illustrates a device providing one embodiment according to the invention.

A 0.75 inch diameter nylon former 1 has a V-shaped helical groove 2 machined on its exterior surface. The groove has a depth and width of 0.050 inches, and extends along a 3.5 inch length of the former with four threads per inch of the former. A tubular membrane 3 fits over the former 1 and is sealed either side of the helical groove by sealing rings 4 and 5 which fit into recesses provided in the former 1.

Passages 6 and 7 extend through the former 1 from one end thereof to each end of the groove 2 and provide an inlet and outlet for carrier fluid. The same end of the former is mounted on a stainless steel holder which in turn is provided with a screw thread enabling the former to be assembled with a stainless steel boss 8 for fitting to a tank, bath or the like. As shown in the drawing, the boss 8 is provided with inlet and outlet tubes 9 and 10 through which a carrier fluid can be introduced into the passage 6 and withdrawn from the passage 7 of the former 1.

In use, the device is conveniently fixed to a side of the tank, bath or the like containing the working liquid.

For dialysis using a semi-permeable, hydrophilic membrane, the carrier liquid is conveniently circulated using a peristaltic pump. It has been found that a rate of flow of carrier liquid through the device of about 1 ml per minute is satisfactory although the rate of flow can be varied as desired.

The device according to the invention can be used to provide a continuous sample from a working liquid which can then be analysed by any convenient method. Where continuous analysis methods are available, it is thus possible continuously to measure components in the working liquid for example using automatic measuring and recording equipment.

One useful application for the device according to the invention is in the measurement of dialysable materials in a fermentation broth. For example, the device can be used in a penicillin fermentation to abstract samples for estimation of penicillin, glucose, ammonium ion or any other parameter of interest. It is important generally in antibiotic production to maintain the sterility of the fermentation broth, the bulk culture usually being maintained in an essentially aseptic condition. When used in fermentation broths, therefore, the device will usually be sterilised before use and must then be sufficiently robust to withstand the sterilisation treatment. Sterile carrier liquid can be used so that if a membrane does rupture sterility problems should not arise.

When utilising the device according to the invention in fermentation broths, care should be taken in using a probe fitted with a cellulosic membrane in broths known to have cellulase activity. In such cases, biodegradation may be avoided by the use of suitable synthetic polymer membranes such as those described by Gregor and Kantner, Journal of Physical Chemistry, 1957, 61, 1169, or commercially available under the name High-Sep 70 from Graver Water Conditioning Company, New York.

The use of probes according to the invention in taking samples from fermentation broths may be advantageous for one or more of the following reasons:

a. the solids content (mainly mycelium) of the fermentation broth may be high providing a fluid of a proteinaceous character with a tendency to clog small orifices, and the probes according to the invention enable samples to be satisfactorily removed from such broths;

b. by transporting actively metabolising substances (e.g. sugars) across the dialysis membrane no further enzyme action can occur following removal of the sample, this possibly not being the case when a whole broth sample is removed from the fermentation broth;

c. the process of dialysis effectively "cleans" the sample thereby facilitating subsequent analysis; and d. the procedure allows continuous aseptic monitoring of the fermentation over lengthy periods of time if required. This is accomplished without disturbance to the organism or depletion of the culture medium and is particularly valuable where the cumulative effect of conventional sampling may seriously impair the yield or effectiveness of a small volume fermentation.

We claim:

1. A sampling device for removing dialysable materials from a liquid for analysis, said device comprising a cylindrical member having a helical groove formed in its exterior cylindrical surface, means fixing a tubular dialysis membrane over the said member whereby the groove and the membrane together form a helical passage for a carrier fluid, and inlet and outlet passages extending into said cylindrical member from the same end thereof, respectively communicating with opposite ends of said helical passage and through which a carrier fluid can be introduced to and withdrawn from the said helical passage, said membrane defining the outermost surface of said device whereby said device may be extended into and exposed to a body of a reacting medium without withdrawing samples therefrom.

2. A device as claimed in claim 1 wherein the helical groove is of V-shaped cross-section.

3. A device as claimed in claim 1 wherein the cylindrical member is formed of synthetic plastic.

4. A device as claimed in claim 3 wherein the synthetic plastic is a polyamide or polytetrafluoroethylene.

5. A device as claimed in claim 1 wherein the fixing means are ring seals located adjacent but outwardly of the ends of the helical groove.

6. A device as claimed in claim 1 wherein said membrane is tubular.

7. A device as claimed in claim 6 wherein the membrane is one of cellulosic or polytetrafluoroethylene material.

8. A method of removing dialysable materials from a liquid for analysis, comprising the steps of: passing a carrier fluid for said materials through a helical passage having a portion defined by a dialysis membrane, extending said passage into said liquid and introducing and withdrawing said carrier fluid to and from said passage from positions adjacent the same end thereof.

9. A method as claimed in claim 8 wherein the liquid is a fermentation broth and a sterile carrier liquid is passed through the device to remove dialysable liquids from the broth through a hydrophilic dialysis membrane.

10. A method as claimed in claim 9 wherein the fermentation broth is a penicillin fermentation broth.

* * * * *